(12) United States Patent
Harding et al.

(10) Patent No.: US 7,626,170 B2
(45) Date of Patent: Dec. 1, 2009

(54) PYROELECTRIC DETECTION SYSTEMS AND METHODS OF MAKING THE SAME

(75) Inventors: Kevin George Harding, Niskayuna, NY (US); Mark Joseph Bartonek, Blue Springs, MO (US); Brandi Elizabeth Wood, Grain Valley, MO (US); Pingfan Peter Wu, Woodbury, MN (US)

(73) Assignee: General Electric Company, Niskayuna, NY (US)

( * ) Notice: Subject to any disclaimer, the term of this patent is extended or adjusted under 35 U.S.C. 154(b) by 87 days.

(21) Appl. No.: 11/871,294

(22) Filed: Oct. 12, 2007

(65) Prior Publication Data
US 2009/0095907 A1    Apr. 16, 2009

(51) Int. Cl.
    *G01J 5/02* (2006.01)
(52) U.S. Cl. .................................. 250/353; 250/DIG. 1
(58) Field of Classification Search ................. 250/353, 250/DIG. 1
    See application file for complete search history.

(56) References Cited

U.S. PATENT DOCUMENTS

| 3,629,585 | A | * | 12/1971 | Desvignes et al. ........... 250/350 |
| 4,087,688 | A | * | 5/1978 | Keller ........................ 250/342 |
| 2004/0211903 | A1 | * | 10/2004 | Bynum et al. ............. 250/341.1 |
| 2005/0116171 | A1 | * | 6/2005 | Lee et al. .................... 250/342 |
| 2006/0131464 | A1 | * | 6/2006 | Hesser et al. ........... 246/169 D |

* cited by examiner

*Primary Examiner*—David P Porta
*Assistant Examiner*—Mindy Vu
(74) *Attorney, Agent, or Firm*—Richard A. DeCristofaro

(57) ABSTRACT

Infrared radiation detection systems and methods of making the same are provided. In one embodiment, the radiation detection system comprises: a housing having an open end exposed to a radiation emitting object; a detector positioned in the housing, the detector comprising a radiation sensing material for detecting infrared radiation, the radiation sensing material having a portion removed by etching or coated by a mask such that only a region of the radiation sensing material is capable of detecting the infrared radiation; and a lens positioned in the housing for transmitting infrared radiation from the object to the detector.

25 Claims, 4 Drawing Sheets

PYROELECTRIC DETECTION SYSTEMS AND METHODS OF MAKING THE SAME

BACKGROUND

This disclosure relates generally to radiation detection and, more specifically, to pyroelectric detection systems and methods of making the same.

Pyroelectric detection systems (also known as optical pyrometers) are commonly used to measure the temperature of a radiation emitting object by projecting the radiation by a lens to a sensing element sensitive to selected wavelengths. For example, the lens can transmit infrared radiation to a sensing element, which converts the infrared radiation to an electrical signal that can be displayed in units of temperature after compensating for ambient temperature variation. Thus, the temperature of an object can be measured without actually contacting the object. The sensing element can comprise a pyroelectric material, i.e., a crystalline structure that can produce current when excited with a change in infrared (IR) energy.

One application of a pyroelectric detection system is in a hot box detector of a train inspection system. In particular, the pyroelectric detection system can be used to detect when the radiation emitted by a train part, such as a wheel bearing or a wheel brake, exceeds a certain threshold at which the operation of the train could be dangerous. For example, the train part could overheat as a result of locked train break or mechanical failure of the train part (e.g., the bearing). A controller in electrical communication with the detection system could send a signal to stop the train when the radiation exceeds the threshold.

There is a growing demand in the train industry to make such pyroelectric detection systems more compact. One way to increase the compactness of a pyroelectric detection system is to shrink the distance from the lens to the sensing element by using a lens having a shorter focal length. However, since the train part dimension is fixed and the distance from the target to the lens is fixed, the shorter focal-length lens has a higher magnification ratio, i.e., the ratio of the size of the target to the size of its image on the sensing element. Thus, radiation outside the desired target area of the train can undesirably reach the sensing element, confusing the decision as to whether a radiation threshold has been exceeded.

A need therefore exists to prevent radiation from outside the desired target area from reaching the sensing element of a pyroelectric detection system despite the use of a relatively short focal-length lens in the system.

SUMMARY

Disclosed herein are radiation detection systems and methods of making the same. In one embodiment, a radiation detection system comprises: a housing having an open end exposed to a radiation emitting object; a detector positioned in the housing, the detector comprising a radiation sensing material for detecting infrared radiation, the radiation sensing material having a portion removed by etching or coated by a mask such that only a region of the radiation sensing material is capable of detecting the infrared radiation; and a lens positioned in the housing for transmitting radiation from the object to the detector.

In another embodiment, a radiation detector comprises: a radiation sensing material for detecting infrared radiation, the radiation sensing material having a portion removed by etching or coated by a mask such that only a region of the radiation sensing material is capable of detecting the infrared radiation.

In yet another embodiment, a method of making a radiation sensing device comprises: depositing a masking layer across a surface of a radiation sensing material for detecting infrared radiation; patterning the masking layer such that the radiation sensing material is partially coated by a mask; and placing the radiation sensing material and a lens within a housing such that the lens is positioned between an open end of the housing and the radiation sensing material to allow the lens to transmit the infrared radiation to an exposed region of the radiation sensing material.

In still another embodiment, a method of detecting radiation comprises: exposing an open end of a housing to a radiation emitting object to allow radiation to be transmitted by a lens positioned in the housing to a detector positioned in the housing, the detector comprising a radiation sensing material for detecting infrared radiation, the radiation sensing material having a portion removed by etching or coated by a mask such that only a region of the radiation sensing material is capable of detecting the infrared radiation.

In an additional embodiment, a radiation detection system comprises: a housing having an open end exposed to a radiation emitting object; a detector positioned in the housing, the detector comprising a radiation sensing material for detecting infrared radiation; a lens positioned in the housing for transmitting radiation from the object to the detector; and an aperture positioned between the lens and the radiation sensing material for blocking a portion of the infrared radiation.

BRIEF DESCRIPTION OF THE DRAWINGS

Referring now to the Figures, which are exemplary embodiments, and wherein the like elements are numbered alike.

DETAILED DESCRIPTION

Figure 1:
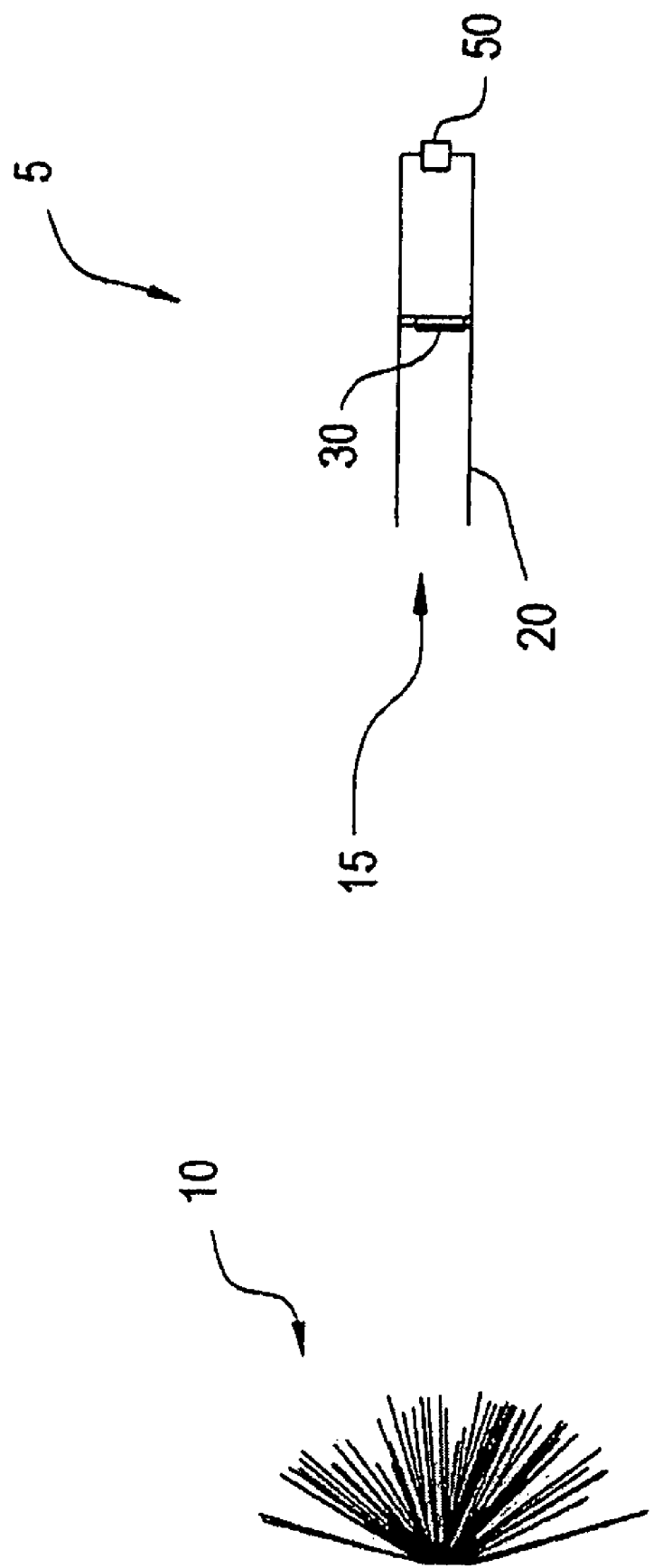
FIG. 1 illustrates using a radiation detection system to detect infrared radiation emitted by an object in accordance with an embodiment.

Pyroelectric radiation detection systems comprising a sensing element partially coated by a mask for blocking radiation are described. In an embodiment, these detection systems are suitable for train inspection applications. In particular, they can be used to detect when a train bearing or wheel becomes too hot to operate safely. FIG. 1 illustrates an exemplary embodiment of a pyroelectric detection system 5 employed to detect infrared (IR) radiation 10 emitted by an object such as a train bearing or wheel. The object emits an amount of IR radiation 10 that is directly related to the temperature of the object. The detection system 5 includes a housing 20 having an open end 15 and a lens 30 within the housing 20 for transmitting an image of the IR radiation 10 to a pyroelectric detector 50 located at the end of the housing 20 opposite to the open end. If the level of IR radiation detected by the IR radiation sensing material exceeds a predetermined threshold value, a control system in communication with the sensing material can send an alert signal, e.g., a signal to stop the train. In this manner, a catastrophic event such as a train derailment can be avoided.

Figure 2:
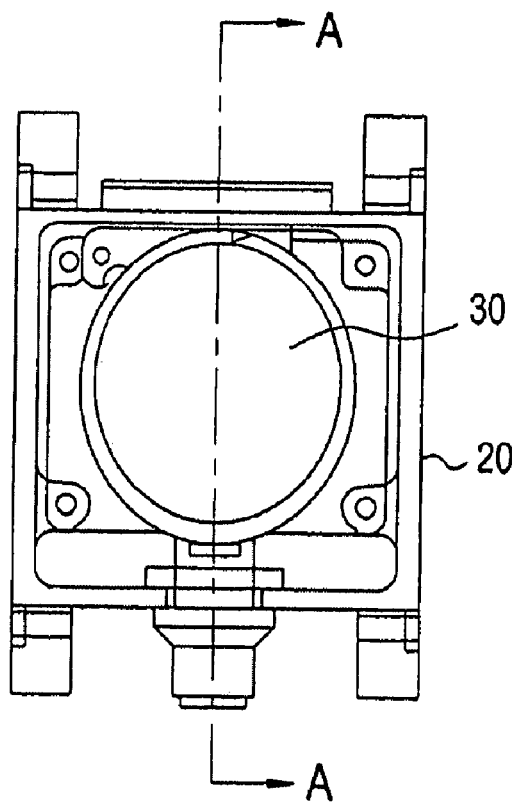
FIG. 2 depicts a side plan view of a radiation detection system in accordance with an embodiment.
Figure 3:
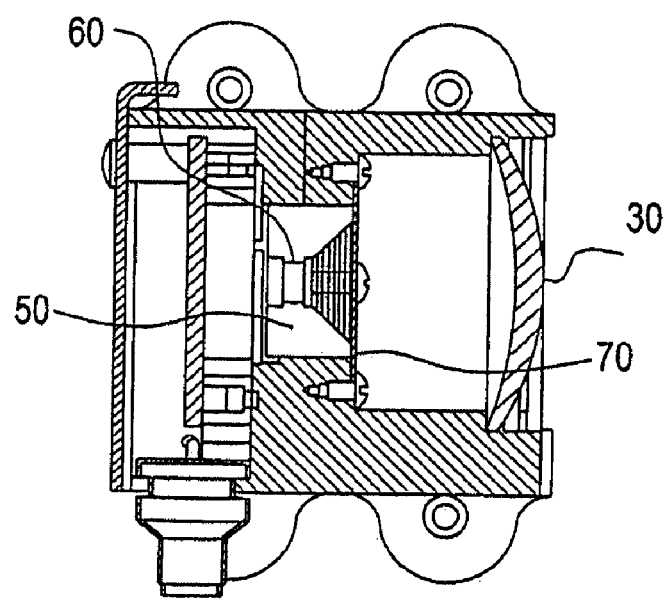
FIG. 3 depicts a cross-sectional view of the radiation detection system shown in FIG. 2.

Turning to FIG. 2, the pyroelectric detection system from FIG. 1 is shown in more detail. The lens 30 disposed in housing 20 is a lens comprising any suitable material for transmitting a substantial amount of the radiation exposed to the open end of the housing 20. It is desirable for the incident radiation to first impinge on a convex surface of the lens 30. In an exemplary embodiment, the lens is a convex lens. Examples of suitable lens materials include but are not limited to germanium (Ge), zinc selenide (ZnSe), and safire. FIG. 3 depicts the pyroelectric detection system along cross-section A-A of FIG. 2. In addition to the lens 30, the detection system includes a pyroelectric detector 50, also known as a pyrometer. Baffle plates 60 and 70 can be configured near detector 50 to block stray light from passing to the detector 50.

Figure 4:
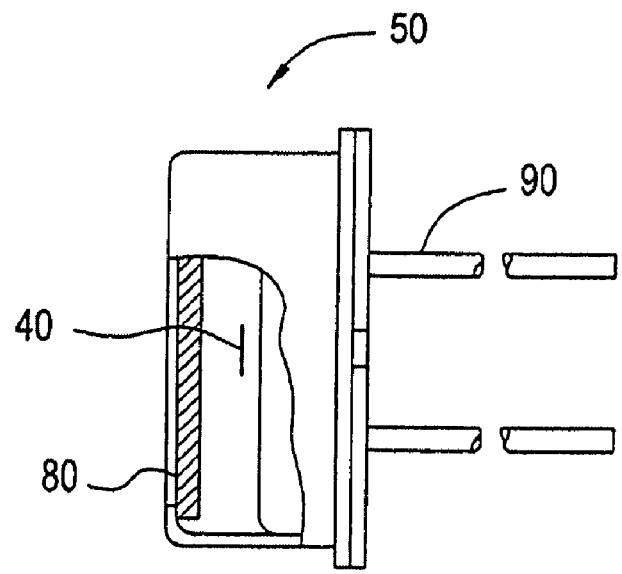
FIG. 4 depicts a cross-sectional view of the pyroelectric detector of the radiation detection system shown in FIG. 3.

As shown in more detail in FIG. 4, the pyroelectric detector 50 comprises a radiation sensing material 40 for detecting IR radiation and a filter window 80 in front of the sensing material 40. It is coupled to a power source by a conductive wire 90. The radiation sensing material 40 can be any pyroelectric crystal suitable for sensing the total IR radiation collected and transmitted by the lens 30. An example of a suitable pyroelectric crystal is lithium tantalate ($LiTaO_3$), which produces an electric current when exposed to changes in IR energy. In an embodiment, the lens 30 transmits substantially all of the IR radiation emitted by an object to the filter window 80, which filters out part of the radiation such that only IR radiation having a wavelength in the range of from about 7 to about 14 micrometers (microns) is transmitted to the radiation sensing material 40. As such, the pyroelectric detector 50 is only sensitive to long-wave IR radiation, which represents the heat radiated from a room-temperature surface.

As described previously, it is often desirable to use a shorter focal length lens. This can be done by using a lens 30 having a smaller radius of curvature or a larger refractive index. For example, an inexpensive salt lens can have a refractive index of 1.7, whereas a more expensive lens made of ZnSe can have a refractive index of 2.7 or a Ge lens can have a refractive index of 4. Thus, a ZnSe or Ge lens having the same radius of curvature as the salt lens could be used to achieve a shorter focal length than the salt lens. Using a shorter focal length lens can cause the magnification of the lens 30 to increase and in turn cause IR radiation outside the target area to be imaged to the radiation sensing material 40, confusing the decision making of the controller as to whether the object being monitored is too hot.

Figure 5:
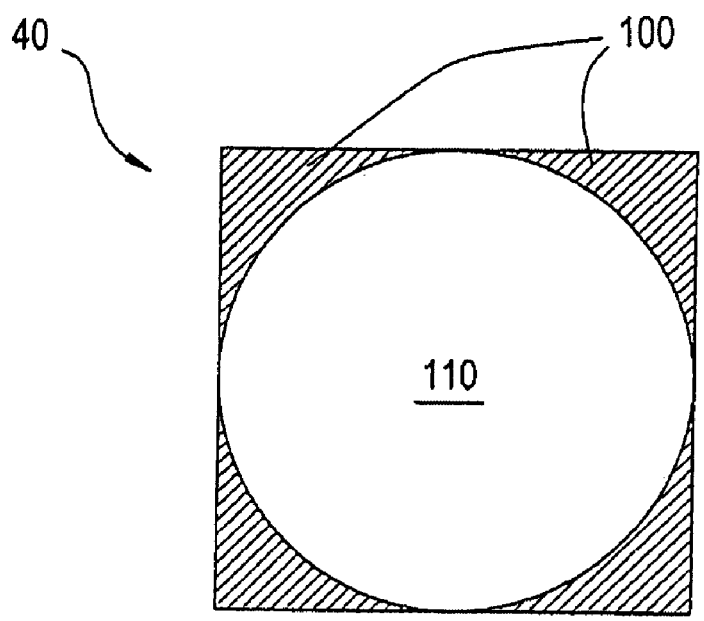
FIG. 5 depicts a sensing element of the pyroelectric detector shown in FIG. 3, the sensing element having a portion removed by etching or coated by a mask for blocking infrared radiation.

In one exemplary embodiment shown in FIG. 5, the above problem can be avoided by etching away corners 100 of the radiation sensing material 40 such that only a substantially circular center region 110 remains to receive the IR radiation. Prior to the removal of the corners 100, a photoresist layer resistant to attack by the selected etchant can be patterned using optical lithography such that the photoresist resides only upon the circular center region 110. The corners 100 can then be etched using an etch technique such as a dry, plasma etch.

In an alternative embodiment, the corners 100 of the radiation sensing material 40 can be coated with a mask for blocking the IR radiation. The mask can include a reflective or absorptive coating having a transmittance of less than or equal to about 10 percent (%), for example, about 1%. A coating transmittance of about 10% would provide a signal to noise ratio of about 10 to 1, while a transmittance of about 1% would provide a more preferred 100 to 1 signal to noise ratio. The mask thus reflects or absorbs most of the radiation passing thereto so as to prevent that radiation from reaching the underlying region of the sensing material 40. Examples of suitable materials for use in the mask include but are not limited to reflective metals such as gold, silver, molybdenum, and tungsten, a reflective dielectric stack comprising different dielectric materials configured to form a reflective coating, or a combination comprising at least one of the foregoing materials. The corners 100 of the radiation sensing material 40 can be coated with the mask by depositing a masking layer across the sensing material 40 using, e.g., sputter deposition, followed by patterning the deposited masking layer using optical lithography and an etching technique such as a dry, plasma etch to remove a select region of the masking layer. The mask can have a thickness of, for example, about 5 nanometers (nm) or greater.

The removal of the corners 100 or the formation of the mask above the corners 100 serves to prevent IR radiation emitted from outside of the target area from being detected by the radiation sensing material 40. Thus, the control system can accurately determine when the target area of the object being monitored exceeds a certain threshold in radiation, indicating that it has been overheated. Allowing the IR radiation to only reach the center region 110 of the radiation sensing material 40 provides also for the use of simple, short focal length lenses having focal lengths that are as little as 25% of the focal lengths of currently used long focal length lenses made for small target viewing. As a result, the pyroelectric detection system could be half the length in size of a long focal length detection system.

Depending on the size of the target area and the magnification ratio of the lens, the size and the shape of the center region 110 can be varied to ensure that its area is smaller than that of the image being transmitted to the radiation sensing material 40. For example, for a 25:1 magnification lens where the target area is a 1 inch (25.4 millimeters) diameter circle, the center region 110 can have a diameter of 1 millimeter (mm). In one embodiment, the uncoated region 110 has an area equivalent to less than about 50%, specifically less than about 25%, and more specifically about 1% to about 6%, of the area of the entire radiation sensing material 40. For example, the sensing material 40 can be about 1 to about 10 mm in width, and the center region 110 can have a diameter of about 2 to about 5 mm to provide viewing of common targets such as wheel bearings that can be, for example, up to a foot or more in size, without seeing surrounding parts not of interest.

Figure 6:
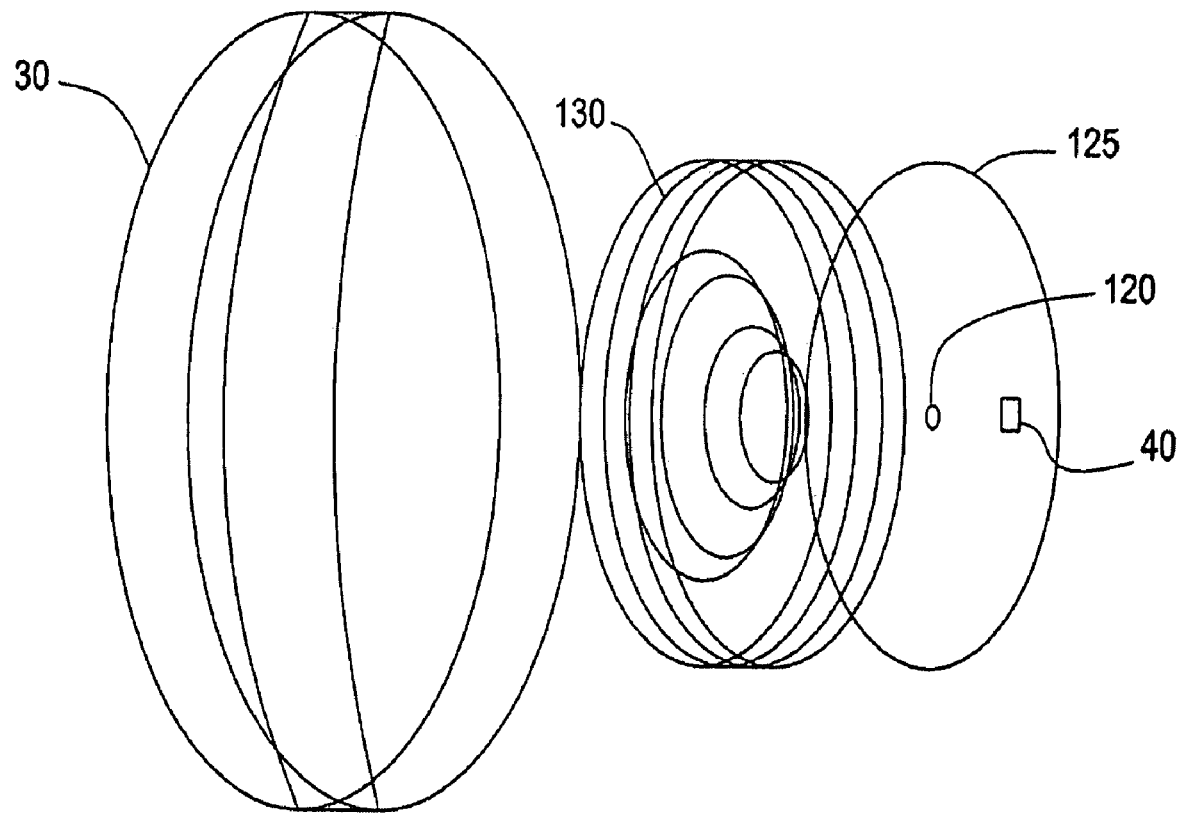
FIG. 6 illustrates a radiation detection system having an aperture in front of its lens in accordance with another embodiment.

To image an exact position on the target surface, the alignment of the photoresist layer during the lithography process has little tolerance for error. Any misalignment can undesirably result in radiation outside the target area passing to the center region 110 of the radiation sensing material 40. As illustrated by the embodiment shown in FIG. 6, to account for such misalignment, an aperture 120 can be positioned between the lens 30 and the radiation sensing material 40, at the image plane of the lens 30. The pyroelectric detector 50 can be moved farther away from the lens 30 to accommodate for the placement of the aperture 120 at the image plane of the lens 30. The aperture 120 can be formed in, for example, a restrictor plate 125. The aperture 120 serves to block a portion of the radiation transmitted by the lens 30. The center of the aperture 120 can be aligned to the center of the lens 30 to maintain the centering accuracy of the detection system. The size of the aperture 120 can be smaller than the center region 110 of the radiation sensing material 40 to ensure that the radiation is recorded from the correct location if the mask 100 is slightly misaligned. If exposed center region 110 is not much larger than the size of the aperture 120, the system can be calibrated to make a good decision. The width of the aperture 120 can be, for example, about 0.1 to about 10 nm. In an alternative embodiment, a radiation sensing material 40 in its original form, e.g., in the shape of a square, can be used in conjunction with the aperture 120 rather than a radiation sensing material having its corners masked or etched away.

In one embodiment, a baffle plate 130 that blocks any stray light outside of the target area from reaching the sensing material 40 can also be positioned between the lens 30 and the aperture 120. The baffle plate 130 can be in the shape of, e.g., a cone having a stair-stepped outer surface. The restrictor plate 125 and the baffle plate 130 can be mechanically machined as part of the lens apparatus before positioning the lens 30 in the housing 20 of the detection system. Alternatively, it could be molded as part of the lens apparatus.

EXAMPLES

The following non-limiting examples further illustrate the various embodiments described herein.

Comparative Example 1

A currently used pyroelectric detection system having a germanium lens with a focal length of 60 mm was used to detect the radiation emitted by a target surface. The lens was positioned between the target surface and a detector having a 1 mm by 1 mm square-shaped $LiTaO_3$ crystal as the sensing material and a filter window that only transmits IR radiation having a wavelength of from 7 to 14 microns in front of the sensing material. This long focal length lens was designed to image a 16 mm diameter target to a 1 mm diameter circle on the sensing material. First, IR radiation emitted by a uniform 1 inch diameter area on the target surface was transmitted by the lens to the detector. The targeted area emitted 1 Watt. Second, the radiation emitted by a uniform 2 inch diameter area on the target surface was transmitted by the lens to the detector. The targeted area emitted 4 W. In both cases, the radiation patterns imaged onto the 1 mm detector were very similar, and IR radiation outside the targeted area did not reach the detector.

Comparative Example 2

The procedure described in Comparative Example 1 was repeated except that a more compact pyroelectric detection system was used in which the lens had a focal length of 38 mm. This shorter focal length lens was designed to image a 1 inch diameter target to a 1 mm diameter circle on the sensing material. For the 1 inch diameter targeted area, the IR radiation pattern imaged onto the 1 mm detector had a fuzzy image boundary due to spherical aberration. For the 2 inch diameter targeted area, the IR radiation pattern imaged onto the 1 mm detector reached the corners of the detector outside the central 1 mm diameter circle. Thus, due to spherical aberration, IR radiation from outside the 1 inch diameter targeted area reached the detector, confusing the decision making of a control system communicating with the detector.

Example 1

The compact pyroelectric detection system having the 38 mm focal length lens used in Comparative Example 2 was again employed to detect radiation emitted by a targeted surface. However, in this Example, corners of the sensing material were removed using photolithography and a plasma etch technique. As a result, only a circular shaped central region of the sensing material remained to detect the IR radiation. First, IR radiation emitted by a uniform 1 inch diameter area on the target surface was transmitted by the lens to the detector. The targeted area emitted 1 Watts. Second, the IR radiation emitted by a uniform 2 inch diameter area on the target surface was transmitted by the lens to the detector. The targeted area emitted 4 Watt. In both cases, the IR radiation patterns imaged onto the detector were very similar, and IR radiation outside the targeted area was not detected by the sensing material As used herein, the terms "a" and "an" do not denote a limitation of quantity, but rather denote the presence of at least one of the referenced items. Moreover, the endpoints of all ranges directed to the same component or property are inclusive of the endpoints and are independently combinable (e.g., "in the range from about 5 wt. % to about 20 wt. %," is inclusive of the endpoints 5 and 20 and all values between 5 and 20). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radiation detection system, comprising:
    a housing having an open end exposed to a radiation emitting object;
    a detector positioned in the housing, the detector comprising a radiation sensing material for detecting infrared radiation, the radiation sensing material having a portion removed by etching or coated by a mask such that only a region of the radiation sensing material is capable of detecting the infrared radiation;
    a lens positioned in the housing for transmitting radiation from the object to the detector; and
    an aperture positioned between the lens and the radiation sensing material for blocking a portion of the infrared radiation, wherein the aperture is smaller than the region of the radiation sensing material capable of detecting the infrared radiation.

2. The radiation detection system of claim 1, wherein the radiation emitting object is a train bearing or a train wheel.

3. The radiation detection system of claim 1, wherein the mask comprises a reflective or absorptive coating having a transmittance of less than about 10%, and wherein the mask covers corners of the radiation sensing material such that the region capable of detecting the infrared radiation is a substantially circular shaped center region.

4. The radiation detection system of claim 1, wherein the mask comprises a reflective metal, a reflective dielectric stack, or a combination comprising at least one of the foregoing, and wherein the radiation sensing material comprises lithium tantalate crystal.

5. The radiation detection system of claim 1, wherein the radiation sensing material is originally substantially square shaped, and wherein the removed portion is corners of the radiation sensing material such that the region capable of detecting the infrared radiation is a substantially circular shaped center region.

6. The radiation detection system of claim 1, wherein the detector further comprises a filter window between the lens and the radiation sensing material for transmitting a portion of the infrared radiation having a wavelength of about 7 to about 14 micrometers.

7. The radiation detection system of claim 1, wherein the mask exposes a center region of the radiation sensing material having an exposed area that is smaller than an area of an image transmitted to the detector.

8. The radiation detection system of claim 1, further comprising a baffle plate configured to block stray light from passing to the radiation sensing material.

9. A radiation detector comprising: a radiation sensing material for detecting infrared radiation, the radiation sensing material having a portion removed by etching or coated by a mask such that only a region of the radiation sensing material is capable of detecting the infrared radiation, wherein the mask exposes a center region of the radiation sensing material having an exposed area that is smaller than an area of an image of a radiation emitting object being transmitted to the detector.

10. The radiation detector of claim 9, wherein the mask comprises a reflective or absorptive coating having a transmittance of less than about 10%, and wherein the mask covers corners of the radiation sensing material such that the region capable of detecting the infrared radiation is a substantially circular shaped center region.

11. The radiation detector of claim 9, wherein the mask comprises a reflective metal, a reflective dielectric stack, or a combination comprising at least one of the foregoing, and wherein the radiation sensing material comprises lithium tantalate crystal.

12. The radiation detector of claim 9, wherein the radiation sensing material is originally substantially square shaped, and wherein the removed portion is corners of the radiation sensing material such that the region capable of detecting the radiation is a substantially circular shaped center region.

13. A method of making a radiation detection system, comprising:
    depositing a masking layer across a surface of a radiation sensing material for detecting infrared radiation;
    patterning the masking layer such that the radiation sensing material is partially coated by a mask;
    placing the radiation sensing material and a lens within a housing such that the lens is positioned between an open end of the housing and the radiation sensing material to allow the lens to transmit the infrared radiation to an exposed region of the radiation sensing material; and
    forming an aperture between the lens and the sensing material and moving the radiation sensing material farther away from the lens, wherein the aperture is smaller than the exposed region of the radiation sensing material.

14. The method of claim 13, wherein the mask comprises photoresist, and further comprising etching away corners of the radiation sensing material uncovered by the mask and removing the mask to allow the infrared radiation to pass to a center region of the original radiation sensing material.

15. The method of claim 13, wherein the mask covers corners of the radiation sensing material to block the infrared radiation from reaching the corners.

16. The method of claim 15, wherein the mask comprises a reflective metal, a reflective dielectric stack, or a combination comprising at least one of the foregoing, and wherein the radiation sensing material comprises lithium tantalate crystal.

17. The method of claim 13, further comprising placing a filter window adjacent to a side of the radiation sensing material facing the lens to allow a portion of the infrared radiation having a wavelength in a range from about 7 to about 14 micrometers to be transmitted to the radiation sensing material.

18. A method of detecting radiation, comprising: exposing an open end of a housing to a radiation emitting object to allow radiation to be transmitted by a lens positioned in the housing to a detector positioned in the housing, the detector comprising an radiation sensing material for detecting infrared radiation, the radiation sensing material having a portion removed by etching or coated by a mask such that only a region of the radiation sensing material is capable of detecting the infrared radiation, wherein the mask exposes a center region of the radiation sensing material having an exposed area that is smaller than an area of an image transmitted to the detector.

19. The method of claim 18, wherein the radiation emitting object is a train bearing or a train wheel.

20. The method of claim 18, wherein the mask comprises a reflective or absorptive coating having a transmittance less than about 10%, and wherein the mask covers corners of the radiation sensing material such that the region capable of detecting the infrared radiation is a substantially circular shaped center region.

21. The method of claim 18, wherein the mask comprises a reflective metal, a reflective dielectric stack, or a combination comprising at least one of the foregoing, and wherein the radiation sensing material is a lithium tantalate crystal.

22. The method of claim 18, wherein the radiation sensing material is originally substantially square shaped, and wherein the removed portion is corners of the radiation sensing material such that the region capable of detecting the radiation is a substantially circular shaped center region.

23. A radiation detection system comprising:
    a housing having an open end exposed to a radiation emitting object;
    a detector positioned in the housing, the detector comprising a radiation sensing material for detecting infrared radiation;
    a lens positioned in the housing for transmitting radiation from the object to the detector; and
    an aperture positioned between the lens and the radiation sensing material for blocking a portion of the infrared radiation, wherein the aperture is formed in a restrictor plate.

24. The radiation detection system of claim 23, wherein the detector further comprises a filter window between the aperture and the radiation sensing material for transmitting a portion of the infrared radiation having a wavelength of about 7 to about 14 micrometers.

25. The radiation detection system of claim 23, further comprising a baffle plate configured to block stray light from passing to the radiation sensing material.

* * * * *